(12) United States Patent
Qian et al.

(10) Patent No.: US 7,864,687 B2
(45) Date of Patent: Jan. 4, 2011

(54) METHODS AND APPARATUS FOR FAULT IDENTIFICATION IN BORDER GATEWAY PROTOCOL NETWORKS

(75) Inventors: Zhiqiang Qian, Holmdel, NJ (US); Paritosh Bajpay, Edison, NJ (US); Mojgan Dardashti, Holmdel, NJ (US); Michael J. Zinnikas, North Brunswick, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 282 days.

(21) Appl. No.: 11/960,211

(22) Filed: Dec. 19, 2007

(65) Prior Publication Data
US 2009/0161556 A1 Jun. 25, 2009

(51) Int. Cl.
*G06F 11/00* (2006.01)
(52) U.S. Cl. .................... 370/242; 370/216; 370/252
(58) Field of Classification Search .......... 370/242
See application file for complete search history.

(56) References Cited

U.S. PATENT DOCUMENTS

| | | | | |
|---|---|---|---|---|
| 5,995,485 A * | 11/1999 | Croslin | | 370/216 |
| 6,173,324 B1 * | 1/2001 | D'Souza | | 709/224 |
| 6,604,113 B1 * | 8/2003 | Kenyon et al. | | 705/36 R |
| 2002/0131362 A1 * | 9/2002 | Callon | | 370/216 |
| 2005/0144467 A1 * | 6/2005 | Yamazaki | | 713/189 |

* cited by examiner

*Primary Examiner*—Jason E Mattis
*Assistant Examiner*—Stephen J Clawson

(57) ABSTRACT

Systems and techniques for fault analysis in a data communication system. A fault analysis console in a provider network serving one or more customer networks responds to a reported loss of connectivity in the customer network by analyzing traffic statistics for a router serving the customer network. If traffic statistics indicate network functionality, border gateway protocol status is evaluated for logical channels being served by the router. Test communications are performed for customer edge router addresses for the logical channels and border gateway protocol status is evaluated for each customer edge router address. Test communications are then performed from a local provider edge router to each remote customer edge router being served.

13 Claims, 4 Drawing Sheets

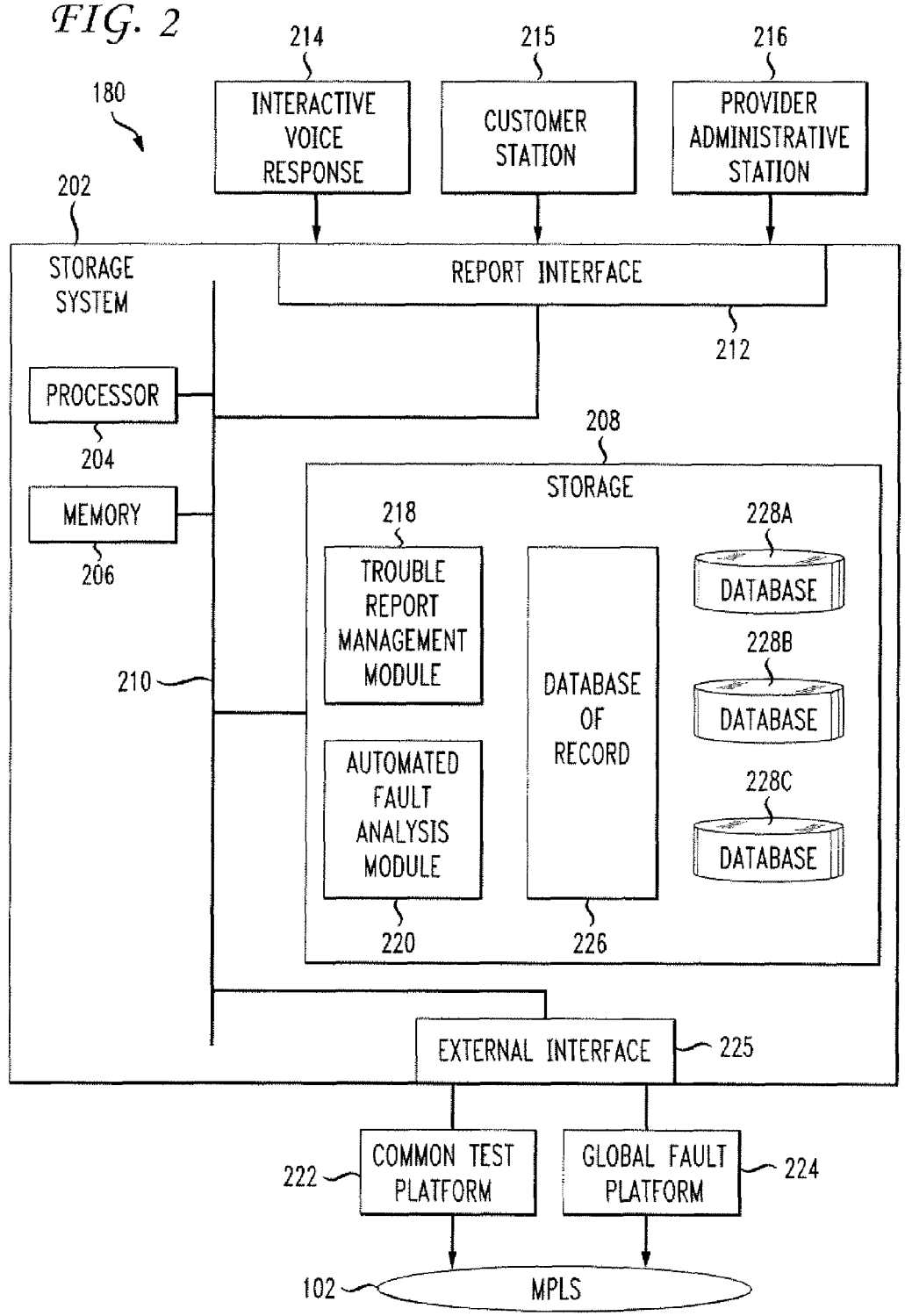

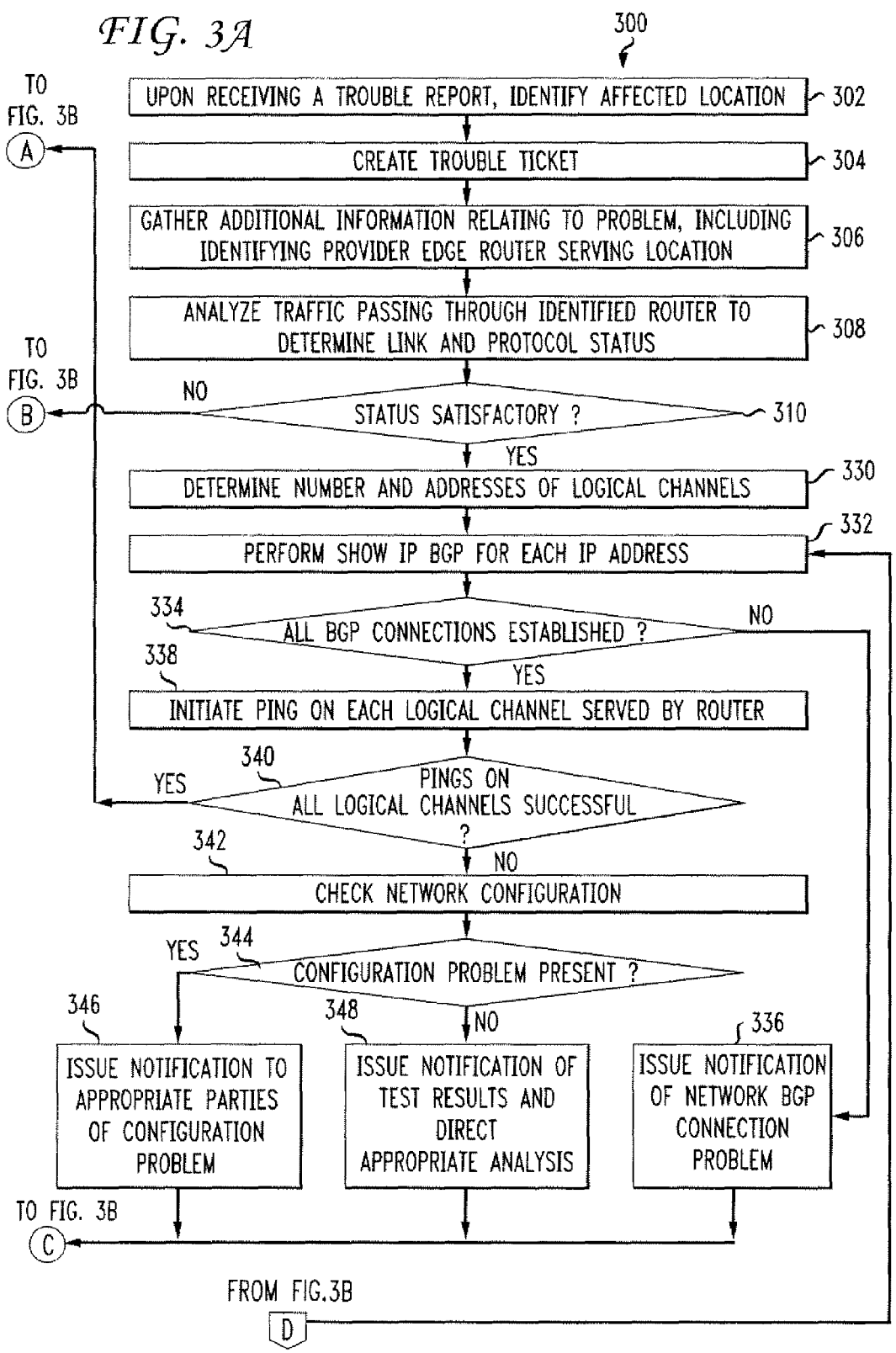

METHODS AND APPARATUS FOR FAULT IDENTIFICATION IN BORDER GATEWAY PROTOCOL NETWORKS

FIELD OF THE INVENTION

The present invention relates generally to improvements to data communication. More particularly, the invention relates to improved systems and techniques for examining communication failures in systems employing border gateway protocol (BGP), identifying whether the communication failure is due to a problem with the network layer in the communication protocol rather than the physical or data transport layers, and isolating the source of the failure.

BACKGROUND OF THE INVENTION

Modern large communication systems provide for transmission of data over packet switched networks. Communication is frequently conducted according to the open systems interconnection basic reference (OSI) model, in which communication is thought of as a hierarchy of layers, from layer 7, the application layer, to layer 1, the physical layer. The application layer defines interfaces and services are provided to end user applications in order to organize data for communication, and the physical layer defines actual physical and electrical connections between devices and the communications over these connections. Of particular interest is layer 3, referred to as the network layer, which governs the management of routing and relaying through networks, from one network node to another. Data packets are organized and transmitted according to protocols defined by layer 2, the data link layer, over connections and using procedures defined by layer 1, the physical layer.

Layer 3 entities may direct data to multiple different nodes, with data traveling to different nodes over paths that involve the same physical connections. In addition, the same physical link may carry multiple data channels. Routing of messages occurs at level 3, and is accomplished by exchanges of information between level 3 entities, such as routers, and construction of routing paths by routers. Routing involves the definition and selection of pathways within and between systems, and systems maintain and distribute information identifying pathways and links. Routers within a system exchange information between one another, and routers at the edge of systems exchange information with routers at the edge of other systems, and this information is shared with routers within systems, so that each entity receiving data to be transmitted can construct proper routine segments so as to convey the information to its destination.

One important communication protocol is border gateway protocol (BGP), which is frequently used between autonomous systems and is therefore classified as an interautonomous system routing protocol. Border gateway protocol transmissions may be used to route data from a provider network to a customer network, such as from an internet service provider (ISP) to a customer virtual private network (VPN). A provider network will route a transmission to a customer network using BGP, and once the transmission has arrived at the customer network, it will be directed to its destination by elements of the customer network. When information transfer between systems fails, or when an autonomous system or elements thereof fail to implement BGP correctly, customers lose the ability to connect to some or all remote devices, because proper routing information is not supplied. For example, a customer virtual private network site may lose the ability to connect to addresses at other sites, or may lose connectivity to other services and networks. A customer is aware only that connectivity has been lost, and does not know whether the reason is a failure of a physical link, a failure of a remote system to which the customer is attempting to connect, or a routing failure, for example. A customer simply reports the failure to the service provider, which then endeavors to resolve the problem as quickly as possible.

SUMMARY OF THE INVENTION

Among its several aspects, the present invention recognizes the need for automated systems and techniques for diagnosing a communication failure experienced by a customer, with the diagnosis including determining whether the failure results from a failure of physical connections or data transport elements, or a routing failure by the provider network. To this end, a trouble resolution mechanism is provided for an autonomous system in order to respond to trouble reports. The trouble resolution mechanism automatically directs the performance of steps to be taken to resolve a trouble report, which may suitably be presented and tracked in the form of a trouble ticket.

First, network port status is evaluated by examining traffic statistics from the router responsible for providing connectivity to the customer entity reporting trouble. The platform retrieves two status reports from the router responsible for providing border gateway protocol services to the customer reporting trouble, separated at a suitable interval, such as a 30 second interval, so that a failure to show an increase in traffic indicates a network port problem, which is then subjected to appropriate analysis. If the failure does not result from a network port problem, analysis is performed on appropriate provider network elements to determine if BGP services are being performed by the provider network. The analysis may include examination of provider network routing information to determine whether proper BGP routing information appears for each customer channel served by the portions of the provider network under examination, with failure indicating a BGP network problem. If the proper routing information is present, test communications, suitably in the form of pings, are performed to confirm connectivity with the customer network. First, pings are performed on each logical channel serving the customer network, with any failures being noted. If pings on all logical channels are successful, routing information is examined for each customer router being served. If proper routing information does not appear, a BGP network problem is noted. If proper routing information is present, pings are performed to each customer router being served, with failure being noted and requiring further analysis, and with success indicating proper functioning of the provider network.

A more complete understanding of the present invention, as well as further features and advantages of the invention, will be apparent from the following Detailed Description and the accompanying drawings.

BRIEF DESCRIPTION OF THE DRAWINGS

FIG. 2 illustrates a fault management console according to an aspect of the present invention; and FIGS. 3A and 3B illustrate a process of communication failure analysis according to an aspect of the present invention.

DETAILED DESCRIPTION

Figure 1:
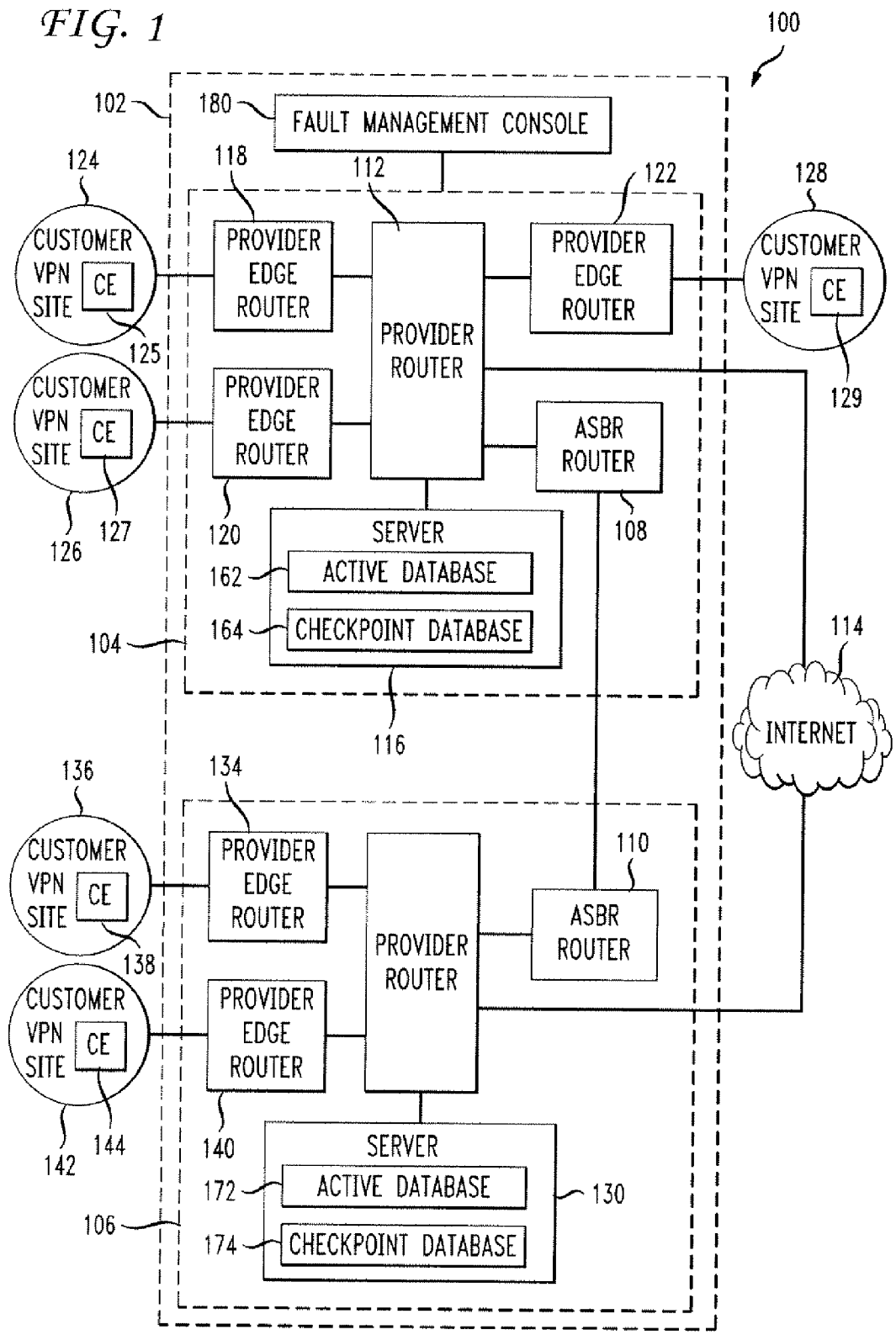
FIG. 1 illustrates a data communication system according to an aspect of the present invention.

FIG. 1 illustrates a communication system 100, according to an aspect of the present invention. The system 100 includes a multi-protocol label switching (MPLS) network 102, providing services to numerous customer systems, of which a few representative systems are illustrated here. The MPLS network 102 illustrated here includes a domestic network 104 and a most of world (MOW) network 106, communicating with one another through asynchronous boundary routers 108 and 110. The network 104 includes a provider router 112 serving as a backbone, providing communications to client devices and networks and providing connections to services and additional networks, such as the Internet 114. The network 104 employs a server 116, providing administrative and other services needed for network management.

To provide connectivity to various customer networks and devices, the network 104 employs a plurality of routers, referred to here as provider edge routers. The network 104 includes provider edge routers 118, 120, and 122, serving the customer virtual private network (VPN) site 124 through its customer edge router 125, the site 126 and CE router 127, and the VPN site 128 and CE router 129.

Similarly, the most of world network 106 includes a provider router 130, server 132, and provider edge router 134 serving the VPN site 136 and CE router 138, and the provider edge router 140 serving the VPN site 142 and CE router 144.

In the present exemplary case, the VPN sites 124, 126, 136, and 142 make up a single network, achieving connectivity with one another and with other networks and services by using the MPLS network 102. The VPN site 128 is a standalone member of a separate customer network, and in the present exemplary case is not a member of a common network with any other VPN sites.

A communication directed from one VPN site to another site to which a connection is desired is directed from the site's customer edge router to the provider edge router serving the VPN site, where it is passed to the appropriate provider edge router within the MPLS network 102 and passed to the destination VPN site. However it will be recognized that the MPLS network 102 may support numerous customer virtual private networks, with each network comprising one or more VPN sites and with each VPN site being able to communicate with other VPN sites in the same network, or with other networks and services, through the MPLS 102.

As the various routers operate, the number of bytes and packets processed by each router 118 is suitably collected, indexed by source and destination IP address. The servers 116 and 130 suitably provide administrative and traffic management services for their respective networks. One activity of particular interest is the management of traffic statistics. Traffic statistics provide insight into the level of service being received by each customer, and proper analysis of traffic statistics can also provide insight into the presence and sources of failures.

Statistics for transit traffic outbound from a router are managed in databases dedicated to managing IP accounting for the MPLS network 102. The domestic MPLS network 104 hosts accounting databases on the router 116. These databases are an active database 162 and a checkpoint database 164. The most of world network 106 hosts an active database 172 and a checkpoint database 174 on the server 130.

As traffic passes through each network, the active databases 162 and 172 are updated to reflect the cumulative traffic passing through the various routers for which they maintain statistics.

In order to manage trouble reports, the MPLS network 102 includes a fault management console 180. The console 180 collects and manages automated and manually initiated reports relating to failures or deficiencies affecting customer service, and directs and tracks responses to reports. The fault management console is illustrated here as a separate entity, but the functions implemented thereby may be performed using the server 116, for example, or may be distributed through various elements of the MPLS network 102.

FIG. 2 illustrates additional details of the fault management console 180. The console 180 suitably includes a computer based communication and storage system 202, suitably including a processor 204, memory 206, and long term storage 208, communicating over a bus 210 with one another and with a trouble reporting interface 212. The trouble reporting interface 212 supports an interactive voice response system 214 for receiving automated customer reports submitted by telephone. The interface 212 is also able to receive reports submitted over the MPLS network 102, for example, from a user workstation 215 at a customer site such as the VPN site 124. The interface 212 is also operative to receive automatically generated reports, for example, a report submitted as a result of automated analysis by facilities at a VPN. For example, elements of a customer VPN may detect that the site is not experiencing the desired service level, and may automatically submit a report of the deficiency. The interface 212 is also operative to receive reports from a provider administrator workstation 216. In order to process reports, the administrative console 180 implements a trouble report management module 218, which may suitably be implemented as software stored on the long term storage 210 and moved to memory 208 as needed for execution by the processor 206. The trouble report management module 218 receives trouble reports and manages the creation and disposition of a trouble ticket, which identifies a report of a problem and tracks the steps taken to correct the problem.

Of particular interest here is diagnosing of border gateway protocol (BGP) faults and status. BGP is used to manage level 3 communications, allowing for construction of paths to route messages to desired destinations, with physical links being used as needed to construct appropriate and efficient pathways. A BGP failure can lead to a loss of connectivity even if a physical link is operating, because the BGP failure prevents proper routing paths from being constructed.

When a customer reports that he or she is experiencing connectivity problems, the cause of those problems is typically unknown. Border Gateway Protocol problems affecting an MPLS network, such as routing table errors, can cause the network to fail to provide services to a customer VPN site, even if all physical links and signal transmission components are operating. Therefore, the fault management console 180 provides for automated procedures to determine if BGP is operating properly at the network boundary between the MPLS network and the VPN site, and to determine whether a communication failure is caused by a layer 1 or layer 2 failure, that is, a physical link or signal transmission failure, rather than a layer 3 failure, that is, a port or routing failure.

In order to manage fault diagnostics and reporting, the fault management system 180 includes an automated fault analysis module 220, performing examination of data and querying communication elements according to a prescribed sequence of procedures to respond to a fault report and trace possible origins of the fault, by issuing commands to various components of the MPLS network 102, examining the responses, and directing further procedures or reports based on the responses. The fault analysis module 220 controls the operation of a common test platform 222 and a global fault platform 224, illustrated here as connected to the communication and storage system 202 through an external interface 22S. Each of the common test platform 222 and global fault platform 224 is dedicated to perform testing procedures as directed by the fault analysis module 220, such as examining traffic statistics, querying specified elements, or the like. The common test platform 222 and the global fault platform 224 issue appropriate commands to elements of the MPLS network 102, such as provider edge routers and system boundary routers. The fault analysis module 220 has access to a database of record 226, which includes information used to identify a customer location reporting a problem and a router serving that customer location. This information includes circuit identification information, subscription identification indicating the quality of service to which the customer is subscribed, identification of the logical channels serving the customer location, and IP addresses of customer equipment. The database of record 226 suitably has access to additional databases, such as the databases 228A-228C, and the fault analysis module 220 suitably passes information to and retrieves information from the databases 228A-228C as needed. For example, the fault analysis module 220 may receive a trouble ticket, may store the ticket in the database 228A, for example, and may update the ticket as needed while it resides in the database 228A. When the fault analysis module 220 has completed the required testing, the trouble ticket may be retrieved from the database 228A and passed to the trouble report management module 218 as needed.

As an example, suppose that the VPN site 124 reports a connectivity failure. Such a failure is experienced at the VPN site 124 when customer edge router 125 belonging to the site fails to receive proper responses from the provider edge router 118 serving the VPN site 124. A trouble ticket is created and the fault analysis module 220 initiate a prescribed set of procedures to determine whether a BGP fault is causing the failure experienced by the customer.

The first step to be taken is to determine whether the fault is due to a layer 1 or layer 3 failure, that is, a physical link or data transport layer. Such a fault will cause a router to fail to send and receive traffic, as opposed to a layer 3 failure, which causes the router to fail to properly direct traffic. Therefore, the fault analysis module 220 examines traffic statistics for the router 118.

As the router 118 operates, the number of bytes and packets processed by the router 118 is collected, indexed by source and destination IP address. Transit traffic outbound from the router 118 is measured in databases dedicated to managing IP accounting for the MPLS network 102.

Figure 3B:
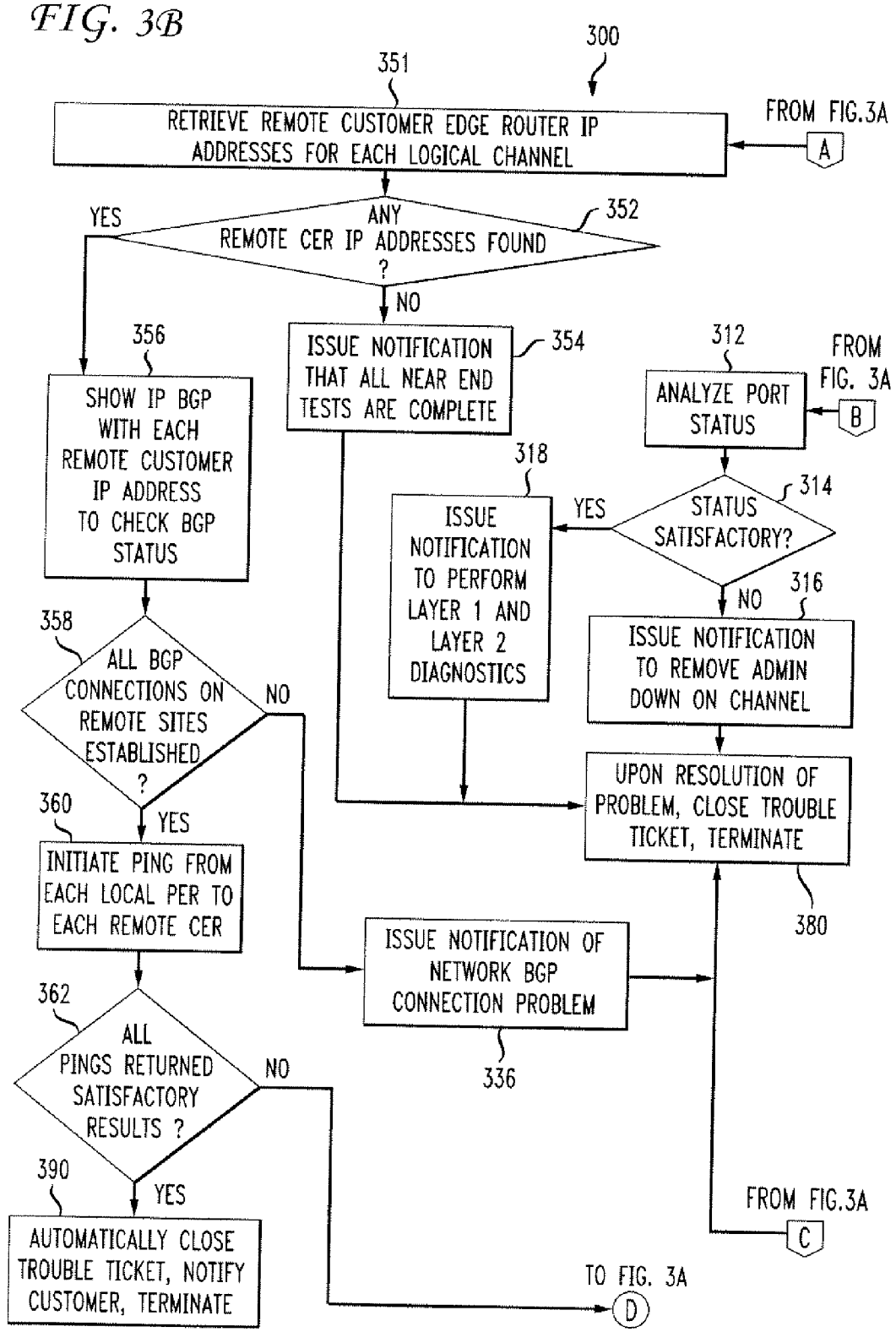

FIGS. 3A and 3B illustrate a process 300 of fault identification and location according to an aspect of the present invention, suitably addressing problems in a system such as the system 100 of FIG. 1, and using elements such as a trouble report management module such as the module 218 of FIG. 2 and a fault analysis module such as the fault analysis module 220 of FIG. 2.

At step 302, upon receipt of a report that a customer location is experiencing poor connectivity, the information received in the report is used to identify the location Identification of the location suitably includes examining stored data correlating customer locations and devices with data received from those locations and devices, such as address information. At step 304, a trouble ticket is created, including appropriate information, including the nature of the problem, the affected customer location, and additional information provided by the customer or obtained by querying the customer location. At step 306, additional information is examined, such as stored information relating to customer connections and services and elements providing services to particular customers, in order to obtain further information relating to the problem, such as the provider elements serving the customer location. Of particular interest is the provider edge router serving the customer location. A provider edge router directs traffic to a customer edge router at a customer site, and the customer edge router then directs traffic received from the provider to appropriate devices within the customer site. The customer edge router receives traffic from devices within the customer site and directs traffic to the provider edge router providing service to the customer site. For example, suppose that a problem report is received for a location at the VPN site 124, and that this location is served by the customer edge router 125. The provider of the MPLS network 102 serves the VPN site 124 using the provider edge router 118. The status of the provider edge router 118 can be examined to provide insight into the problem.

Therefore, at step 308, the traffic analysis is performed on traffic passing through the identified router to determine the layer 3 port status of the router. Two snapshots are taken for the status of the router 118, separated by a suitable interval, such as 30 seconds. The snapshots show cumulative traffic at the router 118, so that if the second snapshot does not show an increase in traffic from the first snapshot, the presence of a routing fault can be identified.

A snapshot of traffic statistics is collected by submitting a command to copy the current status from the active database to the checkpoint database, in the present example, from the active database 162 to the checkpoint database 164. A snapshot can be taken of one or more, or all, of the routers in the system, and examined to provide status information for selected routers, or for the system as a whole. The statistical information provided by the snapshots is examined to determine link and protocol status for the element or elements under consideration, in this case, the router 118. If the subsequent snapshots taken to the checkpoint database do not show a traffic increase for the router 118, the router 118 is not passing traffic properly and the port status of the router needs to be investigated.

At step 310, therefore, the traffic statistics are examined and a determination is made as to whether the statistics indicate a satisfactory link and protocol status. If no, the problem is determined to be unrelated to border gateway protocol failures. The process proceeds to step 312, and the port status is analyzed, by examining port administration information for the router 118. A determination is then made at step 314 as to whether the port administration status is down. If port administration status is down, the process proceeds to step 316 and a notification is issued to correct the status and remove an "administration down" status indicator from the channel served by the router 118. Upon successful resolution, the process proceeds to step 380, the trouble ticket is closed, and the process terminates.

If the port administration status is not indicated to be down, the problem is determined to be a physical link or data transport problem. The process proceeds to step 318 and a notification is therefore issued to perform layer 1 and layer 2 diagnostics. Upon successful resolution, the process proceeds to step 380, the trouble ticket is closed, and the process terminates.

Returning to step 310, if the traffic statistics indicate that link status and protocol status are satisfactory, the process proceeds to step 330 and a determination is made of the number of logical channels served by the local router serving the affected customer site, as well as a determination of the destination IP addresses of the logical channels connected to the local customer edge router at the affected customer site. This information may suitably be obtained by consulting the database of record used to manage system information for fault analysis, such as the database of record 162. The process proceeds to step 332 and the router is queried to show the border gateway protocol status for each destination IP address, suitably using a show IP BGP command. The show IP BGP command returns entries in the BGP routing table, typically stored in and used by routers such as the router 118. The returned information is a pathway to the destination. At step 334, a determination is made as to whether the query has successfully returned information for all IP addresses for the circuit, thus establishing all BGP connections. If the query not been successful, the fault has been identified as a network BGP connection problem. The process proceeds to step 336 and a notification is issued that a network BGP connection problem exists. Such problems typically involve failure to detect the presence or addresses of devices from which communications are to be received or to which communications are to be sent, or failure to constrict proper routing paths. Upon resolution of the problem, the process proceeds to step 380, the trouble ticket is closed, and the process terminates.

Returning to step 334, if the query has successfully returned information for all IP addresses, a test is initiated to determine whether the devices at the addresses can be contacted. The process proceeds to step 338 and a ping is initiated from the provider edge router on each logical channel served by the router, that is, a request for a device on the channel to return identifying information. At step 340, a determination is made as to whether pings on all logical channels have been successful.

If there have not been successful pings on all channels, the process proceeds to step 342, and network configuration information is examined, including virtual routing and forwarding table information, IP address information, and subnet mask information. At step 344, a determination is made as to whether the information indicates that a configuration problem is present. If a configuration problem is present, the process proceeds to step 346 and a notification is issued that a configuration problem exists. Upon resolution of the problem, the process proceeds to step 380, the trouble ticket is closed, and the process terminates.

Returning to step 344, if no configuration problem has been found, additional analysis must be performed. The process proceeds to step 348 and a notification is issued to appropriate parties about the test results, along with a request to resolve the problem. Upon resolution of the problem, the process proceeds to step 380, the trouble ticket is closed, and the process terminates.

Returning now to the decision at step 340, if pings on all logical channels have returned satisfactory results, devices on the logical channels are identified and attempts are made at communication with the devices. At step 351, remote customer edge router IP addresses for each logical channel are retrieved. At step 352, a determination is made as to whether one or more remote customer edge router IP addresses have been found. For example, the VPN site 124 and the VPN sites 126, 136, and 142 are sites on the same virtual private network, so that the IP addresses of the customer edge router 127, 138, and 144 would be remote IP addresses that should be accessible by the VPN 124 through the MPLS 102. The VPN site 128, on the other hand, is not a member of a network having other VPN sites, so that no remote customer edge router IP addresses would be found for the VPN site 128.

If no addresses have been found, the process proceeds to step 354 and a notification is issued to appropriate parties that all near end tests have been completed and have produced satisfactory results. The process terminates at step 380.

Returning now to step 352, if one or more remote customer edge router addresses have been found, the process proceeds to step 356 and a show IP BGP query is performed with each remote IP address to show BGP status. A determination is made at step 358 as to whether all BGP connections at remote sites have been established. If not all BGP connections have been established, the process proceeds to step 360, and a notification is made that a network BGP connection problem exists. Upon resolution of the problem, the process proceeds to step 380, the trouble ticket is closed, and the process terminates.

Returning now to step 358, if all BGP connections have been established, the process proceeds to step 360 and a ping is initiated from the local provider edge router serving the affected site to each remote customer edge router. In the present example, this would be a ping from the provider edge router 118 to each of the customer edge routers 127, 138, and 144. At step 362, determination is made as to whether all pings to all remote customer edge routers have returned satisfactory results. If not all pings have returned satisfactory results, the process returns to step 332 and a notification is issued that further 1 analysis must be performed. Upon completion of the analysis and resolution of the problem, the process proceeds to step 380, the trouble ticket is closed, and the process terminates If all pings have returned satisfactorily, the MPLS network 102 is communicating properly with the customer site and the analysis has completed satisfactorily. The process proceeds to step 390, the trouble ticket is closed, and the process terminates.

While the present invention is disclosed in the context of a presently preferred embodiment, it will be recognized that a wide variety of implementations may be employed by persons of ordinary skill in the art consistent with the above discussion and the claims which follow below.

We claim:

1. A fault management system for a provider communication network, comprising:
   a fault reporting interface for receiving reports of communication failures affecting elements of a customer network served by the provider communication network;
   one or more network interface elements for retrieving information from and directing commands to designated elements of the provider communication network; and
   a failure analysis module operative to perform automated analysis of the provider communication network in order to diagnose a reported communication failure, the failure analysis module querying the provider communication network so as to diagnose whether the reported communication failure is caused by a border gateway protocol failure, querying the provider communication network including identifying a customer location reporting a problem and a router serving the customer location, and examining traffic statistics for the router serving the customer location to determine if the traffic statistics indicate an increase in traffic over a prescribed interval;
   wherein the failure analysis module is operative to respond to a reported communication failure by direction prescribed port failure diagnostics if the traffic statistics indicate improper port performance;
   wherein the failure analysis module is operative, if the traffic statistics indicate correct port performance, to evaluate border gateway protocol status for each customer IP address representing a logical channel on a physical circuit serving the customer station reporting a communication failure and reporting a border gateway protocol status failure if an unsatisfactory status is returned for one or more logical channels; and wherein the failure analysis module is operative, upon establishing satisfactory border gateway protocol status for all logical channels, to direct a test communication over each logical channel and to direct evaluation of network configuration if one or more test communications fails.

2. The fault management system of claim 1, wherein the failure analysis module is operative, upon success of test communications over each logical channel on the physical circuit, to direct evaluation of border gateway protocol status for each IP address representing a customer edge router on each logical channel on the physical circuit and to report a border gateway protocol status failure if an unsatisfactory status is returned for one or more customer edge routers.

3. The fault management system of claim 2, wherein the failure analysis module is operative, if satisfactory status is returned for all customer edge routers, to retrieve all remote customer edge router IP addresses for each logical channel.

4. The fault management system of claim 3, wherein the failure analysis module is operative, if no remote customer edge router IP addresses are found, to report that network performance is satisfactory.

5. The fault management system of claim 3, wherein the failure analysis module is operative, if one or more remote customer edge router IP addresses are found, to perform a test communication to each remote customer edge routers on each logical channel on the physical circuit, to report that network performance is satisfactory if all test communications are successful, and to direct further evaluation if one or more of the test communications is unsuccessful.

6. A method of fault management for a provider network providing communication services to a customer network, comprising:

upon receipt of a report of communication failure affecting an element of a customer network served by the provider network, controlling a processor to examine the report to identify the affected customer elements receiving services from the provider network and the provider network elements serving the affected customer elements; and querying the provider network elements utilizing the processor so as to diagnose the reported communication failure, said querying including determining whether the reported communication failure is caused by a border gateway protocol failure, said querying including identifying a customer location reporting a problem and a router serving the customer location examining traffic statistics for a router serving the customer reporting the communication failure to determine if the traffic statistics indicate an increase in traffic over a prescribed interval, wherein diagnosing the reported communication failure includes direction prescribed port failure diagnostics if the traffic statistics indicate improper port performance;

responding to correct port performance by evaluating border gateway protocol status for each customer IP address representing a logical channel on a physical circuit serving the customer station reporting a communication failure and reporting a border gateway protocol status failure if an unsatisfactory status is returned for one or more logical channels; and responding to an indication of satisfactory border gateway protocol status for all logical channels by directing a test communication over each logical channel and to direct evaluation of network configuration if one or more test communications fails.

7. The method of claim 6, further comprising responding to an indication of improper port performance by evaluating port administration status, directing physical and data transport diagnostics if port administration status is not down, and directing correction of port administration status if status is down.

8. The method of claim 6, further comprising responding to success of test communications over each logical channel on the physical circuit by directing evaluation of border gateway protocol status for each IP address representing a customer edge router on each logical channel on the physical circuit and reporting a border gateway protocol status failure if an unsatisfactory status is returned for one or more customer edge routers.

9. The method of claim 8, further comprising responding to a return of satisfactory status for all customer edge routers by retrieving all remote customer edge router IP addresses for each logical channel.

10. The fault management system of claim 9, further comprising, if no remote customer edge router IP addresses are found, reporting that network performance is satisfactory.

11. The method of claim 9, further comprising, if one or more remote customer edge router IP addresses is found, performing a test communication to all remote customer edge routers on each logical channel on the physical circuit, of reporting that network performance is satisfactory if all test communications are successful, and of directing further evaluation if one or more of the test communications is unsuccessful.

12. A fault management system for a provider communication network, comprising:

a fault reporting interface for receiving reports of communication failures affecting elements of a customer network served by the provider communication network;

one or more network interface elements for retrieving information from and directing commands to designated elements of the provider communication network; and a failure analysis module operative to perform automated analysis of the provider communication network in order to diagnose a reported communication failure, the failure analysis module being operative to query the provider communication network so as to diagnose whether the reported communication failure is caused by a border gateway protocol failure, querying the provider communication network including identifying a customer location reporting a problem and a router serving the customer location, and examining traffic statistics for the router serving the customer location to determine if the traffic statistics indicate an increase in traffic over a prescribed interval, the failure analysis module being further operative to respond to a reported communication failure by directing prescribed port failure diagnostics if the traffic statistics indicate improper port performance, the failure analysis module being further operative to respond to an indication of improper port performance by evaluating port administration status, directing physical and data transport diagnostics if port administration status is not indicated to be down, and directing correction of port administration status if status is indicated to be down, the failure analysis module is operative, if the traffic statistics indicate correct port performance, to evaluate border gateway protocol status for each customer IP address representing a logical channel on a physical circuit serving the customer station reporting a communication failure and reporting a border gateway protocol status failure if an unsatisfactory status is returned for one or more logical channels, the failure analysis module is operative, upon establishing satisfactory border gateway protocol status for all logical channels to direct a test communication over each logical channel and to direct evaluation of network configuration if one or more test communications fails.

13. The fault management system of claim 12, wherein the failure analysis module is operative, upon success of test communications over each logical channel on the physical circuit, to direct evaluation of border gateway protocol status for each IP address representing a customer edge router on each logical channel on the physical circuit and to report a border gateway protocol status failure if an unsatisfactory status is returned for one or more customer edge routers.

* * * * *